United States Patent
Yamaguchi et al.

(10) Patent No.: US 8,012,759 B2
(45) Date of Patent: Sep. 6, 2011

(54) METHOD AND APPARATUS FOR DETERMINATION OF COAGULANT INJECTION RATE IN WATER TREATMENT PROCESS

(75) Inventors: Dabide Yamaguchi, Yokosuka (JP); Yoshiharu Tanaka, Kokubunji (JP); Tokio Ohto, Yokosuka (JP); Takashi Nakayama, Ibaraki (JP)

(73) Assignee: Metawater Co., Ltd., Tokyo (JP)

( * ) Notice: Subject to any disclaimer, the term of this patent is extended or adjusted under 35 U.S.C. 154(b) by 714 days.

(21) Appl. No.: 12/041,705

(22) Filed: Mar. 4, 2008

(65) Prior Publication Data
US 2008/0288111 A1    Nov. 20, 2008

(30) Foreign Application Priority Data

May 18, 2007 (JP) ................................. 2007-132460
Jan. 25, 2008 (JP) ................................. 2008-015022

(51) Int. Cl.
*G01N 35/08* (2006.01)
(52) U.S. Cl. ........................................... 436/55; 436/70
(58) Field of Classification Search .................... 436/55, 436/70
See application file for complete search history.

(56) References Cited

U.S. PATENT DOCUMENTS
6,184,983 B1    2/2001    Yamaguchi et al.

FOREIGN PATENT DOCUMENTS

| JP | 2 114178 | 4/1990 |
| JP | 2 284 164 | 12/1992 |
| JP | 3 205 450 | 8/1995 |
| JP | 3 672 158 | 11/1998 |
| JP | 10-311784 | 11/1998 |
| JP | 2002-90284 | 3/2002 |

*Primary Examiner* — Jill Warden
*Assistant Examiner* — Monique Cole
(74) *Attorney, Agent, or Firm* — Young & Thompson

(57) ABSTRACT

Provided are a method and an apparatus that enable rapid and automatic determination of the coagulant injection rate in a process of water treatment through coagulation and sedimentation. Using a coagulation analyzer comprising sample tanks 1A to 1D each for keeping a predetermined amount of raw water, a water supply pump 7, water supply/discharge valves 4, 6 for raw water and washing water, mixers 3A to 3D, a coagulant injection unit 21, and a detector 30 for determining the particle size and the particle number of flocs, the time within which the coagulant 20 injected into the sample tanks is dispersed by mixing and the particles begin to agglomerate (agglomeration start time) is determined, and based on the thus-determined agglomeration start time, the coagulant injection rate is determined, or the amount of the coagulant to be injected is controlled.

8 Claims, 6 Drawing Sheets

METHOD AND APPARATUS FOR DETERMINATION OF COAGULANT INJECTION RATE IN WATER TREATMENT PROCESS

BACKGROUND OF THE INVENTION

1. Field of the Invention

The present invention relates to a method and an apparatus for determination of the coagulant injection rate (ratio of the amount of coagulant to be injected to the amount of water to be treated) in coagulation and sedimentation for treating surface running water such as river water, lake and marsh water, or industrial water, sewage, sludge, factory wastes, etc.

2. Background Art

A water purification plant employing a rapid filtration system generally comprises a mixing basin for rapid mixing with coagulant injection thereinto, a flocculation basin for growing the flocs formed in the mixing basin, a sedimentation basin for sedimenting and removing the grown flocs, and a filtration basin for removing the particles and flocs that could not be sedimented in the previous step (see FIG. 7 in Patent Reference 2).

The important point in the rapid filtration system is that the coagulant injection rate therein is controlled at a proper level in accordance with the quality of the raw water to be treated (untreated water), thereby forming well-sedimentable flocs. Coagulation treatment, if effected at an unsuitable coagulant injection rate, gives problems of loss head increase in filtration basin, backwash frequency increase, and outflow of particles from filtration basin, owing to carryover of flocs from sedimentation basin or coagulation failure.

A suitable coagulant injection rate varies depending on not only the turbidity of raw water but also the alkali degree, the pH and the temperature thereof, and therefore differs for different raw water; and accordingly, it is impossible to indiscriminately determine the coagulant injection rate on the basis of the raw water turbidity. Heretofore, therefore, the following methods have been employed in water purification plants for monitoring the coagulation condition and determining and controlling the coagulant injection rate.

(1) Jar Test:

The process is as follows: A constant amount of raw water to be treated is sampled in some beakers, the coagulant injection rate is stepwise varied in every beaker, the water in each beaker is coagulated through rapid mixing and slow mixing, then this is statically kept for a predetermined period of time, and thereafter the turbidity of the supernatant and the flocs sedimentation condition in each beaker are checked, thereby determining the coagulant injection rate (see FIG. 8 in Patent Reference 2).

These steps in the process are generally carried out by manual analytic operation; however, as in Patent Reference 1, an auto-jar tester has been put into practical use, which is for full-automatically attaining all the steps of raw water sampling, coagulant injection, determination of mixer rotation number and rotation time, and supernatant turbidity measurement (for its details, see Patent Reference 1).

(2) Injection Rate Formula:

This is for feed-forward control based on the injection rate formula that indicates the relation to a suitable coagulant injection rate with parameters of the turbidity, the pH, the alkali degree and the temperature of raw water. The injection rate is found according to an experimental method based on a jar test and on the turbidity of the precipitated water in actual plants. As an advanced modification of this system, there are known a technique of feedback control combination based on the measured value of precipitated water turbidity, and a technique of utilizing fuzzy and neuro control for approximation to operators' jar test results and running results in actual plants (see paragraphs [0006] and [0007] in Patent Reference 2).

(3) Coagulation Sensor:

This is a method for controlling the coagulant injection rate, in which light beams are applied to the flow of the fluid to be analyzed, and the mean particle size and the particle concentration of the flocs are obtained from the mean value of the transmitted light amount and the standard deviation thereof, and the coagulant injection rate is thereby controlled so that the mean particle size of the flocs could be on a suitable level, like the method of the invention disclosed in Patent Reference 2 (for its details, see Patent Reference 2).

The following Patent References 3 to 6 that disclose the techniques relating to the present invention are described below for convenience of explanation thereof.

Patent Reference 1: JP-A 2-114178
Patent Reference 2: Japanese Patent No. 3205450
Patent Reference 3: Japanese Patent No. 3672158 (corresponding to U.S. Pat. No. 6,184,983)
Patent Reference 4: Japanese Patent No. 2824164
Patent Reference 5: JP-A 10-311784 (laid-open publication of Patent Reference 3, corresponding to U.S. Ser. No. 09/037,431)
Patent Reference 6: JP-A 2002-90284

However, the coagulation condition confirmation method and the coagulant injection rate determination method described in the above have the following problems.

The jar test method of (1) requires operators well skilled in the art, and has a problem in that it may give different data depending on different operators. In addition, it takes a long time of 30 minutes or so for confirming the coagulation condition and for determining a reasonable coagulant injection rate; and therefore, it is difficult to frequently carry out the jar test, and the method is problematic in that the reflection of its data on the coagulant injection rate in actual plants may be delayed.

Use of an auto-jar tester for automation of jar test operation may greatly reduce the load of operators' work; however, the method still takes 30 minutes or so for obtaining the test data, and therefore could not solve the problem of long time lag.

In the method based on the injection rate formula of (2), the injection rate formula differs for different raw water, and therefore, the method requires injection rate formula control in every water purification plant. In addition, in this, there is not the guarantee of permanent usability of the injection rate formula. Specifically, when a dam is constructed on the upstream side of a water intake port, or when river bank construction works are made, or owing to the influence of a heavy rain, the relation between the quality of water and the optimum coagulant injection rate may be broken, and therefore the method has a problem in that it lacks site and time universality.

The method with a coagulation sensor of (3) enables real-time automatic control of a coagulant injection rate to give flocs having a suitable floc particle size, and this solves the operator problem and the time-lag problem in (1) and solves the universality problem in (2). However, the suitable floc particle size differs depending on the quality of raw water, and therefore, for automatic control of coagulant injection, a database must be previously formed for the relation between the raw water turbidity and the optimum floc particle size. Specifically, data with a coagulation sensor must be obtained through the four seasons, and the method is problematic in that it takes a lot of time before its practical use.

In the above, there are mentioned various problems in water purification plants; and needless-to-say, coagulation and sedimentation in treating industrial water, sewage and factory wastes also has similar problems.

SUMMARY OF THE INVENTION

The present invention has been made in consideration of the above-mentioned problems, and an object of the invention is to provide a method and an apparatus for determination of a coagulant injection rate in water treatment through coagulation and sedimentation, which enable automatic determination of a reasonable coagulant injection rate within a short period of time.

To solve the above problems, the invention is a method of determining the ratio of the amount of coagulant to be injected to the amount of water to be treated (coagulant injection rate) in a process of water treatment through coagulant injection to water to be treated followed by coagulation and sedimentation, which comprises the following steps:

(1) A step of collecting a predetermined same amount of the water to be treated in every one of plural sample tanks, and then injecting a predetermined different amount of a coagulant to each water sample collected in those sample tanks, thereby preparing water samples each having a different coagulant injection rate (coagulant injection step);

(2) A step of individually mixing, after the coagulant injection thereto, every water sample to thereby disperse the coagulant therein, and individually determining the time taken before the start of agglomeration of the particles in each water sample (agglomeration start time) for every water sample (agglomeration start time determination step);

(3) A step of computing, based on the agglomeration start time determined for every water sample and on the coagulant injection rate for them, the correlation between the agglomeration start time and the coagulant injection rate, as a fitting line (fitting line computing step);

(4) A step of computing, based on the reasonable agglomeration start time data previously set for a water treatment plant and on the above fitting line, a reasonable coagulant injection rate for the water treatment plant (reasonable coagulant injection rate computing step).

In the invention above, plural sample tanks are used; however, as in the invention of the following, one sample tank may be used repeatedly thereby determining the agglomeration start time for water samples having a different coagulant injection rate. Specifically, of the coagulant injection rate determination method of the above claim 1, the modification comprises the following steps (1a), (2a) and (2b) in place of the above steps (1) and (2).

(1a) A step of collecting a predetermined amount of water to be treated in one sample tank, then injecting a predetermined amount of a coagulant to the water sample collected in the above sample tank, and after the coagulant injection, dispersing the coagulant by mixing, and determining the time taken before the start of agglomeration of the particles in the water sample (agglomeration start time);

(2a) After the above step, a step of washing the sample tank with washing water, then removing the washing water from the sample tank, then again collecting a predetermined amount of the water to be treated in the sample tank, and injecting a predetermined amount, which differs from that in the above step, of the coagulant into the water sample, and determining the agglomeration start time for the water sample;

(2b) A step of repeating the operation of the above step plural times with varying the coagulant injection amount every time, and determining the agglomeration start time for every water sample each having a different coagulant injection rate.

Further as in the invention of the following, in case where a database of a relational formula and the like previously obtained through experiments relative to the correlation between the agglomeration start time and the coagulant injection rate is used, then a reasonable coagulant injection rate may be computed by using one sample tank and by determining the agglomeration start time for one water sample in the tank. Specifically, the method is for determining the ratio of the coagulant injection amount to the amount of water to be treated (coagulant injection rate) in a process of water treatment through coagulant injection to water to be treated followed by coagulation and sedimentation, and this comprises the following steps:

(1) A step of collecting a predetermined amount of the water to be treated in one sample tank, then injecting a certain amount, which is predetermined on the basis of the quality of the water to be treated, of a coagulant to the water sample collected in the sample tank, and after the coagulant injection thereto, mixing it to thereby disperse the coagulant therein, and determining the time taken before the start of agglomeration of the particles in the water sample (agglomeration start time);

(2) When the difference between the measured value of the agglomeration start time as determined in the above and the reasonable value of the agglomeration start time as previously set in accordance with a water treatment plant falls within a predetermined range, a step of determining the coagulant injection rate corresponding to the predetermined amount of the coagulant in the above step (1), as the reasonable coagulant injection rate; but when the above difference is larger than the predetermined range, a step of computing the reasonable coagulant injection rate according to the following process of (21) to (23):

(21) The correlation between the agglomeration start time and the coagulant injection rate is defined by a general formula including two constants, then based on the database previously obtained through experiments, one of those constants is defined based on the quality of the water to be treated, and the general formula including one constant is found;

(22) Based on the general Formula including one constant and on the measured value of the agglomeration start time and the coagulant injection rate at that time, the other constant is found, whereby the computational formula for the correlation between the agglomeration start time and the coagulant injection rate is specifically defined;

(23) Based on the specifically-defined computational formula and the reasonable value of the agglomeration start time as previously set in accordance with the water treatment plant, the reasonable coagulant injection rate is computed.

In a preferred embodiment of the method, the number of the particles in the water sample is counted in their respective particle size sections, and the agglomeration start time is specifically defined by at least any one time of a particle number decrease start time that is determined for the particles previously existing in the water sample before the coagulant injection thereinto and falling in predetermined small particle size sections, or a particle number increase start time that is determined owing to the start of agglomeration after the coagulant injection for the particles in the predetermined large particle size sections larger than those in the above predetermined small particle size sections.

Another preferred embodiment of the coagulant injection rate determination method above is as follows: In the method, the mean particle size and the number of the particles in a water sample are determined, the time at which the mean particle size begins to increase is counted as a floc growth start time, and the point at which the mean particle number to be counted as the number of flocs begins to increase is defined as a floc number increase start time, and the agglomeration start time is specifically defined by at least any one time of the floc growth start time or the floc number increase start time.

Still another preferred embodiment of the coagulant injection rate determination method above is as follows: In the method, the reasonable value of the agglomeration start time to be previously set in accordance with a water treatment plant is one to be set on the basis of the residence time of the water to be treated in the mixing basin provided in the water treatment plant.

The residence time of the water to be treated in the mixing basin is determined by the volume of the mixing basin and the amount of the water to be processed in the actual water treatment plant (actual plant). The reasonable coagulant injection rate in the actual plant varies every moment depending on the quality of the water to be treated (raw water), and therefore, the water to be treated must be suitably collected in a sample tank and the reasonable coagulant injection rate must be determined in accordance with the change.

Further, as an invention relating to an apparatus for determination of the coagulant injection rate, preferred is the invention of the following. Specifically, this is an apparatus for carrying out the coagulant injection rate determination method above, and comprises at least one sample tank equipped with a mixer, a coagulant injection device for injecting a predetermined different amount of a coagulant, an agglomeration start time counter, and a computer device for computing a reasonable coagulant injection rate.

The present invention makes it possible to automatically determine a reasonable coagulant injection rate within a shorter period of time than in conventional methods, in a process of water treatment through coagulation and sedimentation.

In these drawings, 1, 1A to 1D are a sample tank; 3, 3A to 3D are a mixer; 4 is a raw water intake valve; 5 is a raw water discharge valve; 6 is a tap water intake valve; 7 is a water supply pump; 10 is a raw water feed valve; 11 is a water discharge valve; 12 is a overflow wall; 14 is a water level control tank; 20 is a coagulant; 21 is a coagulant injection unit; 22 is a coagulant injector tube; 23 is an injector tube operator; 24 is a stage; 30 is a detector for measuring the particle size of flocs and counting the particle number thereof; 31, 31A to 31D are a water intake tube; 32, 32A to 32D are a water intake pump; 33 is an electric signal from detector; 34 is a sequencer for analyzing the electric signal from detector and for device control; 35 is a POD for displaying the measured value and for inputting the condition data in device setting.

DETAILED DESCRIPTION OF THE INVENTION

Embodiments of the invention are described with reference to FIG. 1; and their details are described in the section of Examples. The invention should not be restricted by the description of the following embodiments and Examples.

Figure 1:
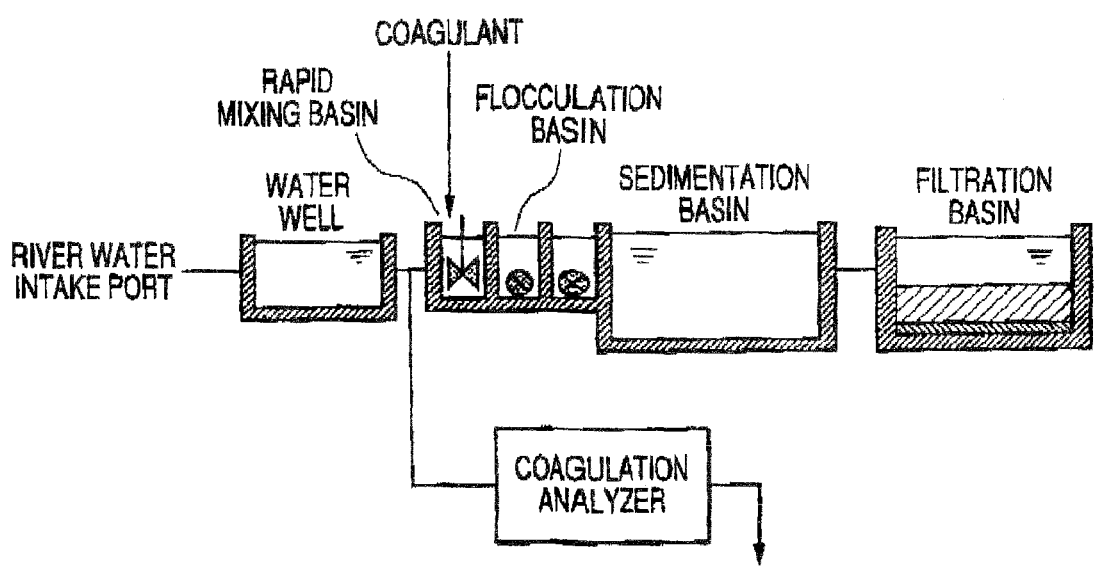
FIG. 1 is an essential flowchart of Example 1, in which a coagulation analyzer, as an apparatus for carrying out the coagulant injection rate determination method of the invention, is connected to a water purification process flowchart.

In general, in coagulation and sedimentation treatment, particles agglomerate and grow into flocs in a process from rapid mixing in a mixing basin after injection of a coagulant thereinto to slow mixing in a flocculation basin, as in FIG. 1. In this stage, it is fundamental that the agglomeration begins in the mixing basin, and it is important that the agglomeration start time is on the same level as that of the residence time in the mixing basin.

In this situation, the treatment after the mixing basin may be attained favorably, thereby giving well-sedimentable flocs and reducing the turbidity of the precipitated water. In this, the agglomeration start time is influenced by the quality such as the turbidity, the alkali degree, the pH and the temperature of raw water, and also by the mixing intensity and the coagulant injection rate; and of those, the coagulant injection rate may be readily controlled in actual plants. Specifically, when the coagulant injection rate is lower than a reasonable level, then the agglomeration start time may be longer than the residence time in the mixing basin, thereby causing problems in the subsequent flocculation. On the other hand, when the coagulant injection rate is higher than a reasonable level, then the agglomeration start time may be shorter than the residence time in the mixing basin, and the coagulant is under situation of over-injection. In the present invention, a part of the water to be treated (raw water) is led to run into a coagulation analyzer shown in FIG. 1, and in this coagulation analyzer, the coagulant injection rate is controlled so that the agglomeration start time could be a predetermined value for the water quality that varies every moment, whereby the same results as those in evaluation of the floc sedimentation performance and the supernatant turbidity in a jar test and those in optimum floc particle size control with a coagulation sensor could be obtained.

Specifically, in the coagulation analyzer, when the agglomeration start time is determined and the coagulant injection rate is controlled in accordance with the time, then the method does not require a step of statically keeping the system after the slow mixing step, and therefore the coagulant injection rate may be automatically determined within about 10 minutes or so. Accordingly, the operation by some skilled operators as in the jar test may be omitted, and further, coagulant injection rate control taking a shorter time lag than that with an auto-jar tester may be realized. In addition, since the method does not require a database of raw water turbidity and reasonable floc particle size distribution which, however, is required by a coagulation sensor, the coagulant injection rate control system with the coagulation analyzer is characterized in that it may be driven for practical use within a relative short period of time after the apparatus installation.

Next described are concrete methods of determination of the agglomeration start time and determination and control of the coagulant injection rate, using a coagulation analyzer.

For determination of the agglomeration start time in the invention, employed is at least any one of the following two methods. The first method is a particle counting method, and this is the same as the method disclosed in Patent Reference 3. The particle counting method is as follows: A water sample running in a detector is irradiated with light beams, and at least one light of the front scattering light, the side scattering light, the back scattering light and the transmitted light is received by a photoelectric converter, and from the number of the electric signal pulses converted in the photoelectric converter within a predetermined period of time and the height of each pulse, the number of the particles is counted in their respective particle size sections. In the first method of the invention, for the particles falling within the particle size sections in which the number of the particles is large, the time at which the number of the particles begins to decrease from the coagulant addition start time is referred to as a particle number decrease start time; and for the particles falling within the particle size sections in which the number of the particles is small, the point at which the number of the particles begins to increase is referred to as a particle number increase start time; and at least any one or both of the particle number decrease start time and the particle number increase start time are employed for specifically defining the agglomeration start time.

The second method is a fluctuation analyzing method, and this is the same as the method disclosed in Patent Reference 4. The fluctuation analyzing method is as follows: A water sample running in a detector is irradiated with light beams from at least one site, and at least one light of the front scattering light, the side scattering light, the back scattering light and the transmitted light is received by a photoelectric converter, and from the mean value and the standard deviation of the electric signals converted and outputted from the photoelectric converter within a predetermined period of time, the mean particle size and the number of the particles contained in the water sample are found. In the second method of the invention the time at which the mean particle size begins to increase from the coagulant addition start time is referred to as a floc growth start time; and the time at which the number of the particles to be counted as flocs begins to increase from the coagulant addition start time is referred to as a floc increase start time; and at least any one or both of the floc growth start time and the floc increase start time are employed for specifically defining the agglomeration start time.

The method of finding the mean particle size and the particle number from the mean value and the standard deviation of the electric signals is described in Patent Reference 4. As a modification of the patent method, there is known a method of controlling the coagulant injection rate so that the floc mean particle size could be on a reasonable level, like the method described in Patent Reference 2. However, these differ from the present invention in the following points. First, in the methods described in Patent Reference 4 and Patent Reference 2, a coagulant is injected continuously, and therefore, the suspensoid particles before coagulation exist along with flocs in various growth stages. Accordingly, in the methods described in Patent Reference 4 and Patent Reference 2, it is impossible to determine the time at which the number of particles begins to decrease through agglomeration of particles, the time at which the particle size of flocs begins to increase with the start of the growth of flocs, and the time at which the number of blocs begins to increase (agglomeration start time), which, however, are determined in the present invention. As a result, in the methods described in Patent Reference 4 and Patent Reference 2, it is impossible to realize controlling the coagulant injection rate based on the agglomeration start time as in the present invention. To that effect, it should be said that the method of the present invention differs from the methods of the inventions of Patent Reference 4 and Patent Reference 2.

The device with which the agglomeration start time and the number and the mean particle size of flocs are determined according to the above-mentioned first or second method of the present invention is referred to as a coagulation analyzer.

As the method of controlling a coagulant injection rate in the invention, employed is any of the following methods. The first method is as follows: In a coagulation analyzer, an agglomeration start time is determined at a different coagulant injection rate, and from the measured value, a relational formula of the agglomeration start time and the coagulant injection rate is derived, and thereafter a set value of a predetermined reasonable agglomeration start time is given to the relational formula, thereby finding the optimum coagulant injection rate.

The second method is as follows: In an injection rate formula having at lest one index of the turbidity, the alkali degree, the pH and the temperature of raw water, as a Parameter, a coagulant injection rate that may be expected to be reasonable is previously found, and in case where the agglomeration start time at that injection rate is determined with a coagulation analyzer, and when the agglomeration start time falls outside a predetermined time range, then from the relational formula of the predetermined agglomeration start time and the coagulant injection rate, the correction value of the coagulant injection rate is found for correcting the agglomeration start time to fall within the predetermined time range.

EXAMPLES

Example 1

As in FIG. 1, the coagulation analyzer in the invention is disposed in a water purification system where raw water taken from a river is fed into a water well, then led to a rapid mixing basin in which it is rapidly mixed with a coagulant injected thereinto, and then the agglomerates formed in the rapid mixing basin are grown into flocs in a flocculation basin, then the resulting flocs are sedimented in a sedimentation basin, and the supernatant is filtered in a filtration basin, in such a manner that the analyzer is branched from the line from the water well in the system. As the case may be, the coagulation analyzer may be connected to a raw water line through which raw water is fed to a quality test room for the purpose of carrying out a jar test or for inspection of the quality of raw water.

In this, the present invention is characterized in that the reasonable coagulant injection rate, as determined from the agglomeration start time found in the coagulation analyzer, is reflected on the coagulant injection rate in the water purification process.

Figure 2:
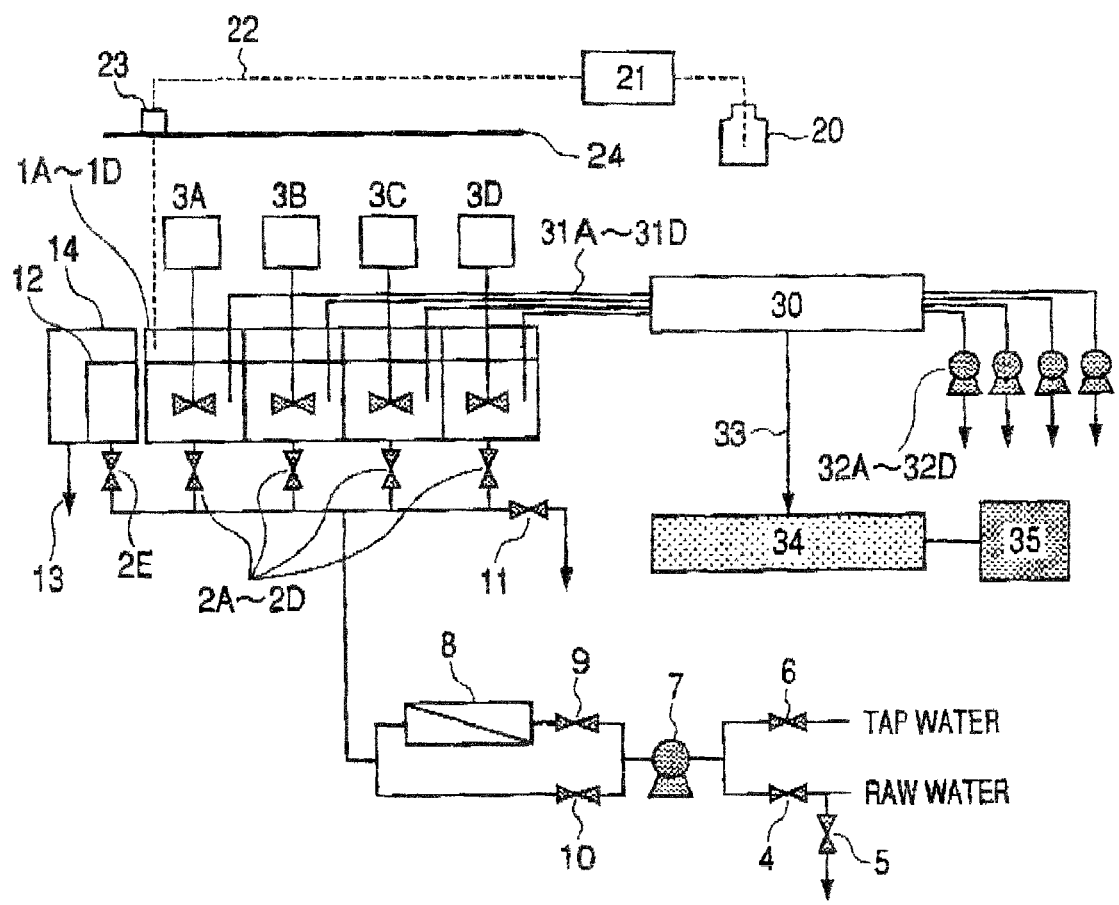
FIG. 2 is a schematic constitutional view of Example 1, showing the coagulation analyzer of FIG. 1.

The coagulation analyzer in Example 1 comprises, as in FIG. 2, a plurality of (4 in this Example) sample tanks 1A to 1D for keeping a predetermined amount of raw water, water supply/discharge valves 2A to 2E, mixers 3A to 3D, a raw water intake valve 4, a raw water discharge valve 5, a tap water intake value 6, a water supply pump 7, a filter 8, a filter inlet valve 9, a raw water feed valve 10, a water discharge valve 11, a water level control tank 14 connected with a duct 13 for discharging the water overflowing from the overflow wall 12, a coagulant 20, a coagulant injection unit 21, a coagulant injector tube 22, an injector tube operator 23, a stage 24, a detector 30 for measuring the particle size of flocs and counting the particle number thereof, water intake tubes 31A to 31D, water intake pumps 32A to 32D, a sequencer 34 for analyzing the electric signal 33 from detector and for device control, and a POD (programmable operation display) 35 for displaying measured value and for inputting condition data in device setting.

In this, the detector 30 comprises, as disclosed in Patent Reference 3, a light beam radiation unit comprising any of a laser, LED or lamp for radiating light beams toward a water sample, a photoelectric converter that receives at least any one light of the front scattering light, the side scattering light, the back scattering light or the transmitted light generated by the particles contained in a water sample, and converts it into an electric signal, and an electric circuit that counts the number of the particles in their respective particle size sections from the number of the converted electric signal pulses and the height of the pulses.

As a concrete method of measuring the particle size and counting the number of particles, there are known the method described in Patent Reference 5 for counting the number of the particles in a water sample, as an example of using a semiconductor laser as the light radiation unit and using an optical system of receiving front scattering light, and the method described in Patent Reference 6 as an example of using a semiconductor laser as the light radiation unit and using an optical system of receiving transmitted light. In this Example, the detector 30 is driven according to the above-mentioned particle counting method; however, in place of it, the optical system according to a fluctuation analyzing method as in Patent Reference 4 may also be employed.

Next described is a concrete process of the method for determining the agglomeration start time.

First, for discharging the water sample remaining in the sample tanks 1A to 1D, the mixers 3A to 3D, the water supply pump 7, and the water intake pumps 32A to 32D are stopped; the raw water discharge valve 5 is opened; the raw water intake valve 4, the tap water intake valve 6, the filter inlet valve 9, and the raw water feed valve 10 are shut; and the water supply/discharge valves 2A to 2E, and the water discharge valve 11 are opened (this is hereinafter referred to as a water sample discharge step).

Figure 3:
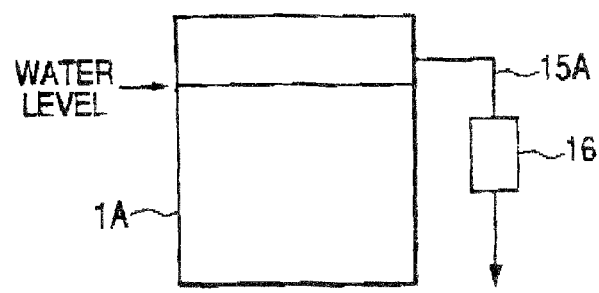
FIG. 3 is a schematic, side cross-sectional view of the sample tank in FIG. 2.

After the water sample is discharged out of the sample tanks 1A to 1D, the tap water intake valve 6 and the filter inlet valve 9 are opened, and tap water is fed into the system by the water supply pump 7 via the tap water intake valve 6; and via the filter inlet valve 9, the water passes through the filter 8 by which particles are removed (hereinafter, this is referred to as washing water). The washing water is then fed into the sample tanks 1A to 1D and the water level control tank 14 via the water supply/discharge valves 2A to 2E. The water discharge valve 11 is shut, whereby the sample tanks are gradually filled with the washing water; and as in FIG. 3 showing the side view of the sample tank, the water having overflowed from the sample tank is discharged via the ducts 15A to 15D (only 15A is shown) (hereinafter this is referred to as a washing water Feed step).

In this, the height of the overflow must be higher than the water level defined by the height of the overflow wall 12. In case where a flow meter 16 having a flow switch or an output function is disposed in the system, then the situation where the sample tanks are filled with water could be automatically detected. In this step, when the mixers 3A to 3D are kept working to wash the sample tanks, then it is effective in treatment of raw water having high turbidity and chromaticity.

After the washing water feed step, or that is, after the washing water is fully fed to the sample tanks, the water intake pumps 32A to 32D are driven, and the washing water is analyzed with the detector 30. In this step, when the voltage level as measured in the photoelectric converter, and the information of the particle size and the particle number to be obtained through conversion of the number and the height of the pulses generated when the particles run through the light beams are kept in memory, then the contamination of the optical system and the deterioration of the filter may be confirmed and further the quantity of light may be corrected (hereinafter this is referred to as a zero water determination step).

After the zero water determination step, the discharge valve 11 is opened, the water supply pump 7 is stopped, the filter inlet valve 9, the raw water feed valve 10 and the tap water intake valve 6 are shut, and the washing water in the sample tanks and the water level control tank are discharged (hereinafter this is referred to as a washing water discharge step); and then the raw water intake valve 4 and the raw water feed valve 10 are opened, the raw water discharge valve 5 is shut, the water supply pump 7 is driven, the water discharge valve 11 is shut, and the water supply/discharge valves 2A to 2E are opened (hereinafter this is referred to as a raw water feed step).

After the sample tanks are filled with raw water, or that is, after a predetermined period of time or after the flow meter 16 having a flow switch or an output function detects each sample tank filled with raw water, then the water supply pump 7 is stopped, the raw water feed valve 10 and the raw water intake valve 4 are shut, and the raw water discharge valve 5 is opened. With that, the water level in each sample tank reaches the height of the overflow wall 12 in the water level control tank 14, and the water sample of the same capacity may be defined in every test. Then, the water supply/discharge valves 2A to 2D are shut (hereinafter this is referred to as a water level control step).

In this, for the overflow wall 12, a material having a different height may be used in different cases, thereby changing the capacity of the water sample.

After the water level is controlled, the mixers 3A to 3D are driven at a predetermined revolution speed. Next, the water intake pumps 32A to 32D are driven, the number of the particles in raw water or the turbidity of raw water is determined with the detector 30; and based on the measured value, the range of the coagulant injection rate in each of the sample tanks 1A to 1D is determined. In this step, the discharge water from the water intake pumps 32A to 32D may be returned back to the sample tanks. After the raw water is assayed for a predetermined period of time, a coagulant 20 is injected into the sample tanks 1A to 1D in that order from a coagulant injection unit 21 that comprises a metering pump or a syringe pump. In this, the coagulant injection tube 22 is connected to the injection tube operator 23 and moves on the stage 24, whereby a certain amount of a coagulant that is determined through the above measurement is injected into each sample tank (hereinafter this is referred to as a coagulant Injection step).

Figure 4:
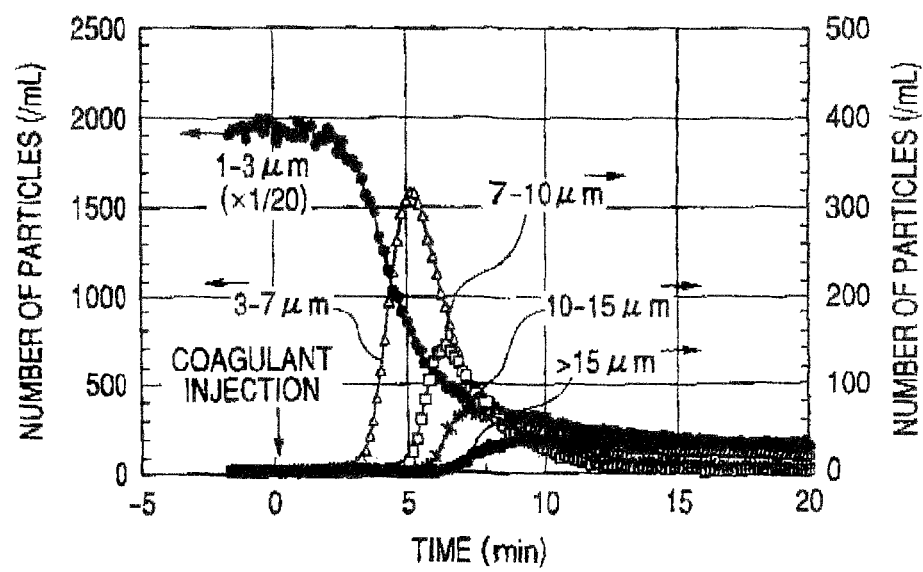
FIG. 4 is a graph showing the profile of the particle number counted after coagulant injection into water samples.

After the coagulant is injected, it is dispersed by mixing to start agglomeration of particles. FIG. 4 shows the profile of the particle number counted with the detector 30 in this step. Specifically, the raw water tested in this Example contained a lot of particles having a particle size of from 1 to 3 μm, the particles were counted with the detector 30 before the coagulant injection; but in about 3 minutes after the coagulant injection, the agglomeration began, and the number of the particles having a particle size of from 1 to 3 μm began to decrease. Afterwards, the number of particles having a particle size of from 3 to 7 μm, which did not almost exist before the coagulant injection, began to increase. This shows the agglomeration of particles to form microflocs. After further lapse of time, the microflocs grew larger flocs, and therefore the number of the particles having a particle size of from 3 to 7 μm began to decrease and at the same time, the number of particles falling within a particle size section of from 7 to 10 μm, and those within a section of from 10 to 15 μm began to gradually increase.

Figure 5:
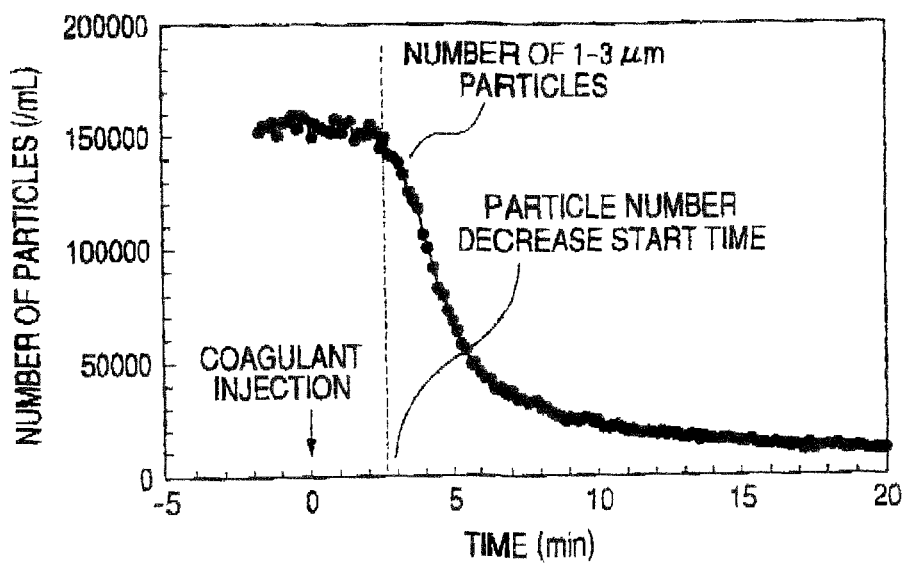
FIG. 5 is a graph showing one example of the test data relating to the profile of the particle number of 1 to 3-μm particles, for explanation of agglomeration start time.
Figure 6:
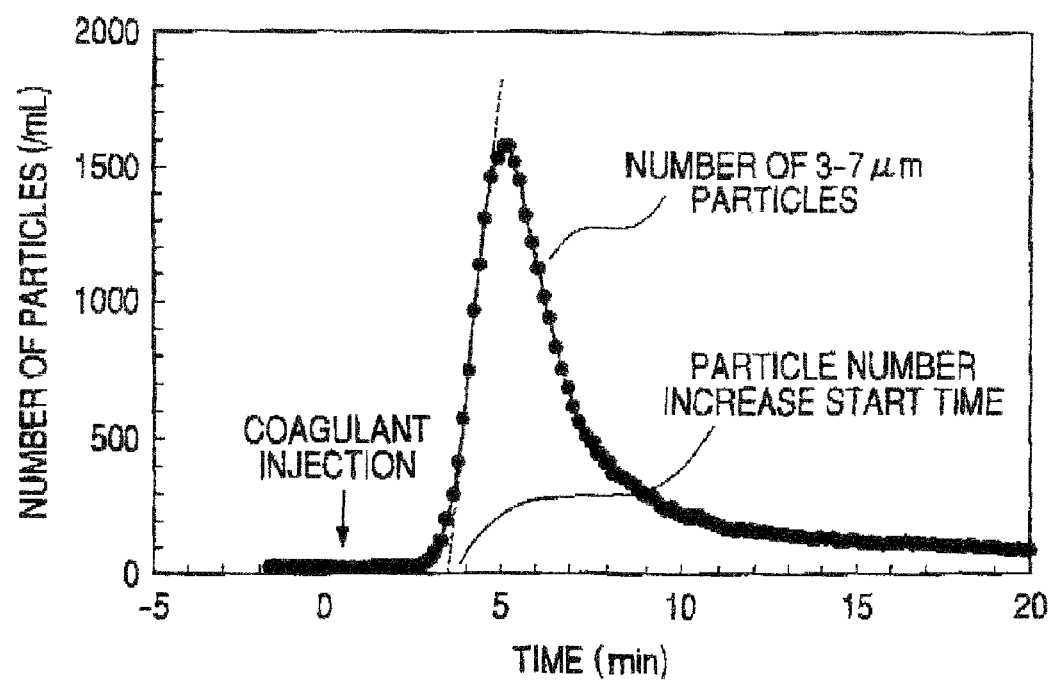
FIG. 6 is a graph showing one example of the test data relating to the profile of the particle number of 3 to 7-μm particles, for explanation of agglomeration start time.

In this apparatus, the number and the particle size of the particles that are predominantly present in the raw water to be treated may be selected and determined in any desired manner; and the suitable particle size of the particles that may be in the raw water treated in this Example is from 1 to 3 μm. In this, the time at which the number of particles begins to decrease is defined as a particle number decrease start time, as in FIG. 5. In this apparatus, the particle number is outputted and led into the sequencer 34 from the detector via the electric signal 33, and the particle number decrease start time is confirmed in the sequencer and kept in memory. On the other hand, the number and the particle size of the particles not so much existing in the raw water may also be selected and determined in any desired manner; and in this Example, the particle size of the particles is suitably from 3 to 7 μm. In this, the time at which the number of particles begins to increase is defined as a particle number increase start time, as in FIG. 6; and the time is kept in memory in the sequencer (hereinafter this is referred to as an agglomeration start time determination step).

Either one of the particle number decrease start time or the particle number increase start time is taken as the agglomeration start time; or the mean value of both the two is taken as the agglomeration start time; and this may be previously determined, and any of these may be employed herein.

Figure 7:
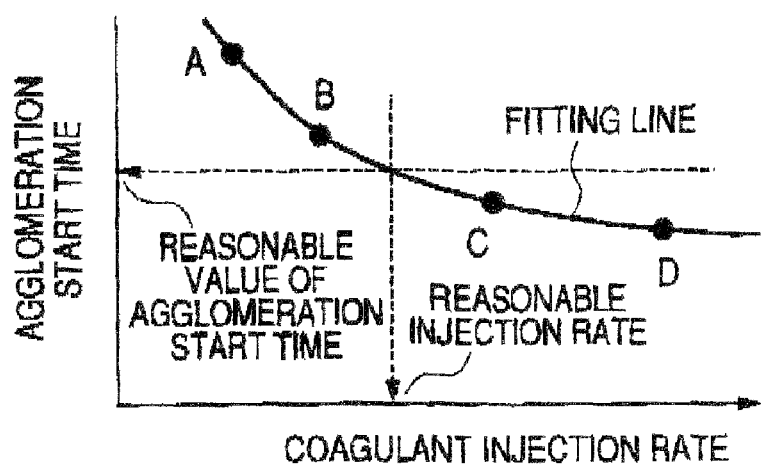
FIG. 7 is a graph showing the fitting line as a correlation between agglomeration start time and coagulant injection rate.

When the agglomeration start time in each sample tank is determined, then the relation between the coagulant injection rate and the agglomeration start time in each of A to D may be plotted, as in FIG. 7. The coagulation analyzer in the invention is to find the relational formula (fitting line) between the coagulant injection rate and the agglomeration start time through polygonal line approximation or least square approximation to multinomial expression with these data (hereinafter this is referred to as a fitting line computation step).

Next, the agglomeration start time previously set as a reasonable value in a water treatment plant is given to the above-mentioned relational formula, thereby computing a suitable coagulant injection rate (this is hereinafter referred to as a reasonable coagulant injection rate computation step).

The reasonable value of the agglomeration start time may be determined on the basis of the residence time in a mixing basin, but it may be corrected in accordance with the running results of the coagulant injection rate in an actual plant. The residence time in a mixing basin is determined depending on the volume of the mixing basin and the amount of water to be treated in an actual plant.

After the coagulant injection rate is computed, the process again returns back to the sample discharge step, and the above steps are repeated. In the above description, demonstrated is an example case where plural sample tanks are used; however, as so mentioned hereinabove, one sample tank may be used repeatedly for determining the agglomeration start time of water samples each having a different coagulant injection rate. In addition, the reasonable coagulant injection rate computed in the manner as above may be utilized as a set value in changing manually the injection rate in an actual plant, or in inputting into the injection rate control system in a central monitor unit.

Figure 8:
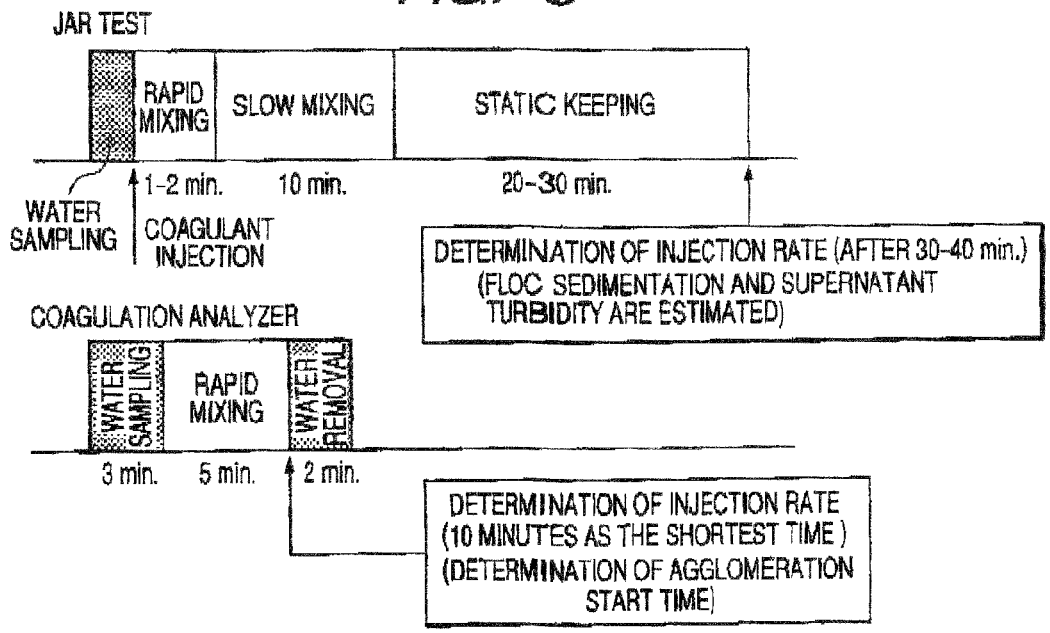
FIG. 8 is a comparative explanatory view showing a conventional method and a method of the invention of Example 1, relative to the time to be taken for determination of coagulant injection rate in those methods.
Figure 9:
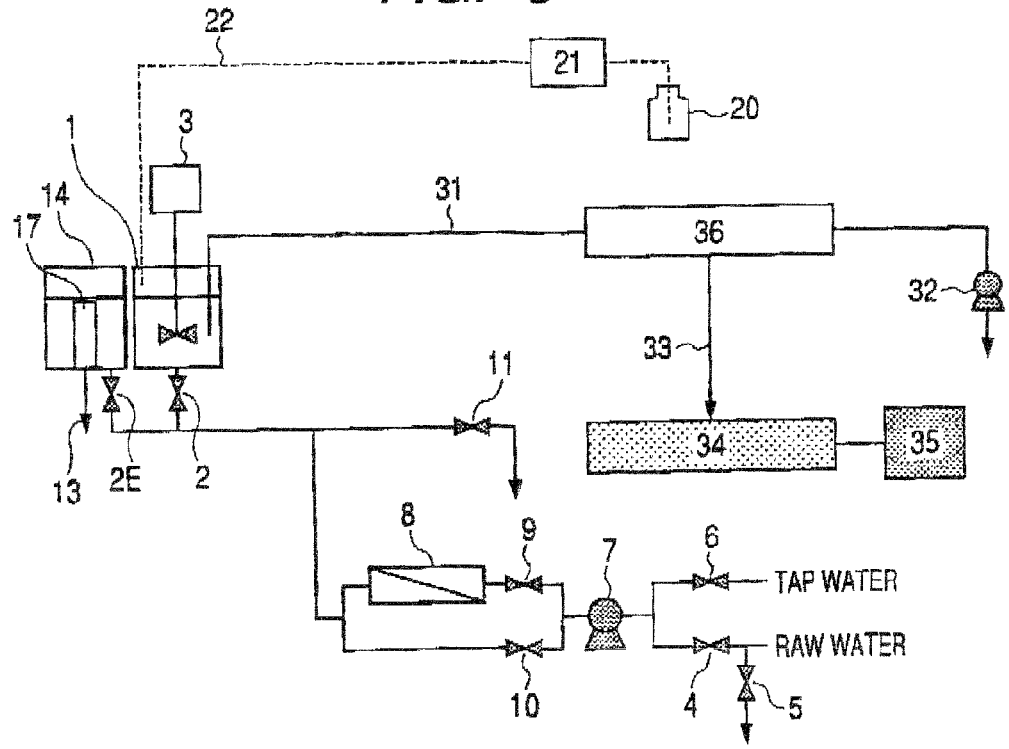
FIG. 9 is a schematic constitutional view of Example 2 that differs from FIG. 2, showing the coagulation analyzer of FIG. 1.

Next described is a comparative explanatory view of FIG. 8 showing a conventional method and a method of the present invention, relative to the time to be taken for determination of coagulant injection rate in those methods. According to the invention, the reasonable coagulant injection rate may be determined within a shorter period of time, as compared with the jar test. This is because, as in FIG. 8, the invention does not require the slow mixing step and the statically keeping step which the jar test requires.

Example 2

Next, Example 2 is described with reference to FIGS. 9 to 12. As in FIG. 9, the coagulation analyzer in the invention comprises a sample tank 1 for keeping a predetermined amount of raw water, water supply/discharge valves 2, 2E, a mixer 3, a raw water intake valve 4, a raw water discharge valve 5, a tap water intake valve 6, a water supply pump 7, a filter 8, a filter inlet valve 9, a raw water feed valve 10, a water discharge valve 11, a water level control tank 14 connected to a duct 13 through which the overflow from the overflow tube 17 is discharged away, a coagulant 20, a coagulant injection unit 21, a coagulant injection tube 22, a detector 36 for determining the mean particle size and the mean particle number of flocs, a water intake tube 31, a water intake pump 32, a sequencer 34 for analyzing the electric signal 33 from detector and for device control, and a POD 35 for displaying measured value and for inputting condition data in device setting.

In this, the detector 36 comprises a light beam radiation unit comprising any of a laser, LED or lamp for radiating light beams toward a water sample, a photoelectric converter that receives at least any one light of the front scattering light, the side scattering light, the back scattering light or the transmitted light generated by the particles contained in a water sample, and converts it into an electric signal, and an electric circuit that determines the mean particle size and the mean particle number of flocs from the mean value and the standard deviation of the converted electric signals. Concrete methods of determining the particle size and the particle number are described in Patent Reference 4. The detector 36 in this Example functions according to the above-mentioned fluctuation analyzing method; however, for this, an optical system that functions according to the particle counting method described in Patent Reference 3 may also be employed.

Next described is a concrete process of the method for determining the agglomeration start time. First, the basic operation in the process of the water sample discharge step, the washing water feed step, the zero water determination step, the washing water discharge step, the raw water feed step, and the water level control step is the same as in Example 1. The different points are that the number of the sample tanks is one, which is, however, a plural number in Example 1, that the overflow wall in the water level control tank is changed to the overflow tube, and that the stage and the injector tube operator for coagulant are omitted.

After the water level control, the mixer 3 is driven at a predetermined revolution speed, and then the water intake pump 32 is driven. In this step, the discharge water from the water intake pump may be returned back to the sample tank 1. Next, using an injection rate formula with parameters of the quality such as the turbidity, the alkali degree, the pH and the temperature of the raw water, as determined by the coagulation analyzer or by any other device, the coagulant injection ratio that is expected to be reasonable is previously found, and this is set as the coagulant injection rate in the sample tank 1. Next, a coagulant 20 is injected into the sample tank 1 from a coagulant injection unit 21 that comprises a metering pump or a syringe pump (hereinafter this is referred to as a coagulant injection step).

Figure 10:
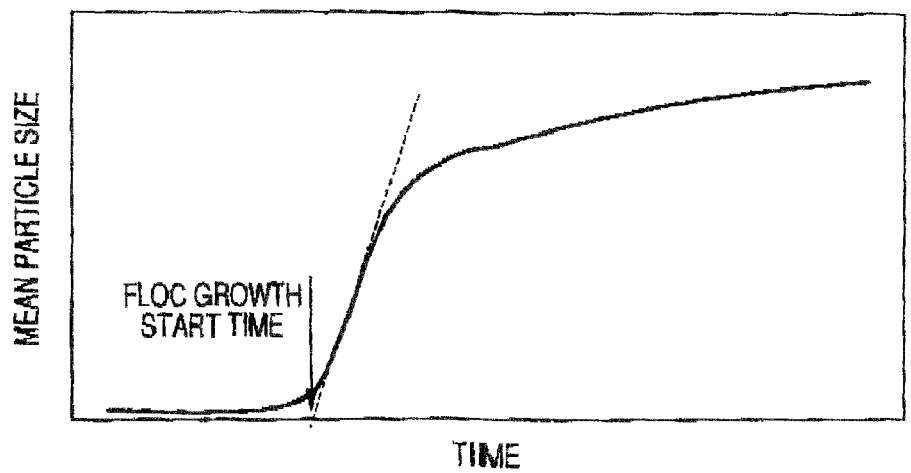
FIG. 10 is a graph showing the profile of the mean particle size as measured after coagulant injection into water sample, relative to floc growth start time.
Figure 11:
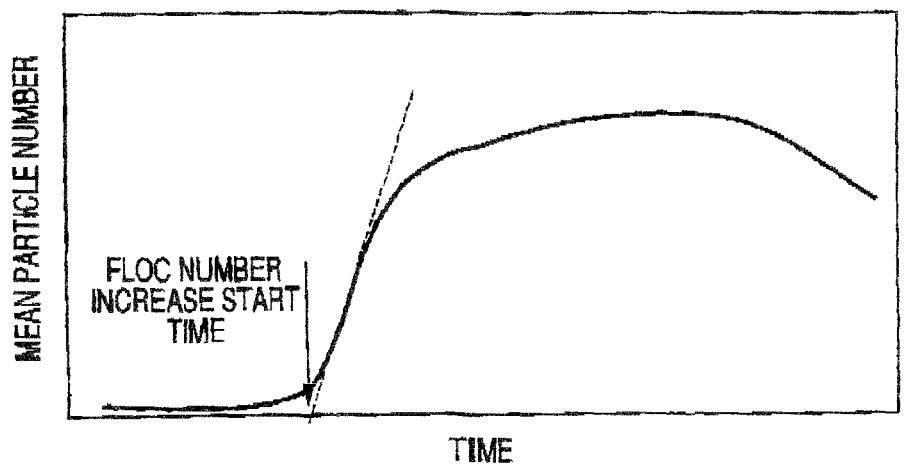
FIG. 11 is a graph showing the profile of the mean particle number of flocs as measured after coagulant injection into water sample, relative to floc number increase start time.

After the coagulant is injected, it is dispersed by mixing to start agglomeration of particles. FIG. 10 shows the profile of the mean particle size of the flocs measured with the detector 36. In this, the mean particle size of the flocs is outputted and led into the sequencer 34 via the electric signal 33 from the detector; and the time at which the particle size of the flocs begins to increase from the coagulant injection start time is kept in memory in the sequencer, as a floc growth start time. On the other hand, the profile of the mean particle number of the flocs is as in FIG. 11, and the time at which the number of the flocs begins to increase from the coagulant injection start time is kept in memory as a floc number increase start time (hereinafter this is referred to as an agglomeration start time determination step).

Either one of the floc growth start time or the floc number increase start time is taken as the agglomeration start time; or the mean value of both the two is taken as the agglomeration start time; and this may be previously determined, and any of these may be employed herein.

In case where the difference between the measured value of the agglomeration start time as determined in the above and the reasonable value of the agglomeration start time as previously set in accordance with a water treatment plant falls within a predetermined range, then the coagulant injection rate corresponding to the predetermined amount of the coagulant in the above agglomeration start time determination step is determined as a reasonable coagulant injection rate; but in case where the difference is larger than the predetermined range, then the reasonable coagulant injection rate is computed according to the process of (21) to (23) in the above-mentioned claim 3. Its details are described below.

Specifically first, the relation between the coagulant injection rate and the agglomeration start time is found as a general formula through experiments. Some general formulae may be proposed, but for example, herein employable is the following numerical formula (1) represented by an exponential function:

$$T = \alpha \exp(-\beta P) \quad (1)$$

wherein T represents an agglomeration start time; P represents a coagulant injection rate; $\alpha$ and $\beta$ are constants that differ depending on the quality such as the temperature, the pH, the alkali degree and the turbidity of water. Next, from at least one parameter of the quality of the raw water with which the agglomeration start time is determined, one constant $\alpha$ is defined. The relation between the parameter of the water quality and $\alpha$ is previously found through experiments.

Next, the numerical value of $\alpha$, the measured value of the agglomeration start time and the coagulant injection rate at that time are given to the general formula, whereby the value of $\beta$ in the general formula is found, and thus all the constants in the general formula are thereby determined (hereinafter this is referred to as an injection rate computation formula).

In this, even though the general formula is represented by functions differing from those in the formula (1), the constants may be so determined that the number of the unidentified constant in the general formula is only one on the basis of the relation between the water quality and the constant obtained through experiments, before the measured value of the agglomeration start time and the coagulant injection rate are given to the formula.

Next, the reasonable value of the agglomeration start time is given to the injection rate computation formula, and the reasonable coagulant injection rate is computed. The above is a detailed description of the reasonable coagulant injection rate computation step.

Figure 12:
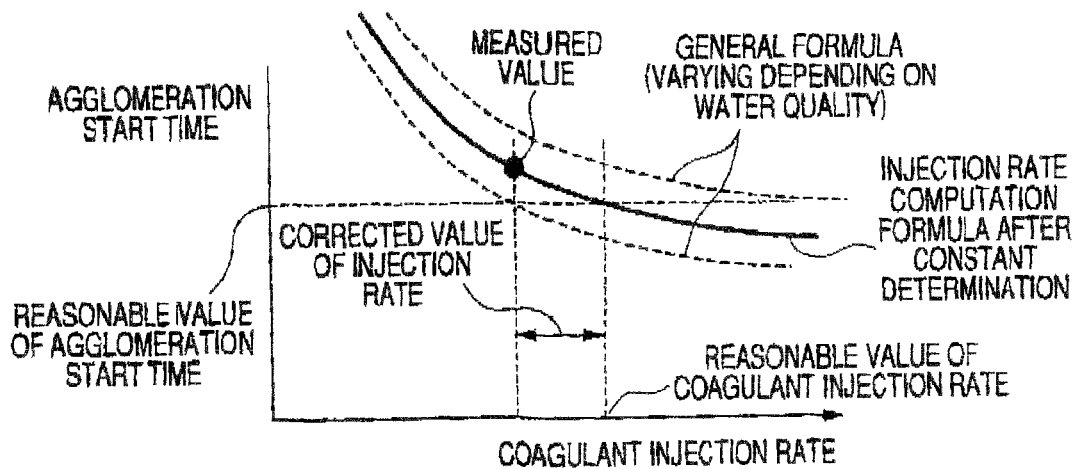
FIG. 12 is a graph showing the relation between the measured value and reasonable value of agglomeration start time, the general formula of coagulant injection rate and agglomeration start time, and the Injection ratio computation formula after determination of constants, in Example 2.

FIG. 12 is an example showing the relation between the measured value and the reasonable value of the agglomeration start time, the general formula of coagulant injection rate and agglomeration start time, and the injection ratio computation formula after determination of constants. In this drawing, the measured value of the agglomeration start time is larger than the reasonable value thereof, the coagulant injection rate is corrected (increased). Specifically, the measured value of the agglomeration start time and the coagulant injection rate at the time are given to the general formula that varies depending on the water quality, and the injection rate computation formula is thereby determined. Accordingly, the reasonable value of the coagulant injection rate may be found so that the agglomeration start time could be the reasonable value thereof. Changing the injection rate in an actual plant to the thus-determined, reasonable injection rate value makes it possible to correct the coagulant injection rate determined by the injection rate computation formula.

As described in the above, the method of the invention where the agglomeration start time is determined with the coagulation analyzer and the coagulant injection rate is thereby controlled in accordance with the thus-determined time does not require the process from the slow mixing step to the statically keeping step; and according to the method of the invention, therefore, the coagulant injection rate may be automatically determined within a shorter period of time as compared with any other conventional method.

FIG. 1:
1. River Water Intake Port
2. Water Well
3. Rapid Mixing Basin
4. Coagulant
5. Flocculation Basin
6. Sedimentation Basin
7. Filtration Basin
8. Coagulation Analyzer FIG. 2:
1. Tap Water
2. Raw Water FIG. 3:
1. Water Level FIG. 4:
1. Number of Particles (/mL)
2. Coagulant Injection
3. Time (min)
4. Number of Particles (/mL)
FIG. 5:
1. Number of Particles (/mL)
2. Coagulant Injection
3. Number of 1-3 μm Particles
4. Particle Number Decrease Start Time
5. Time (min)
FIG. 6:
1. Number of Particles (/mL)
2. Coagulant Injection
3. Number of 3-7 μm Particles
4. Particle Number Increase Start Time
5. Time (min)
FIG. 7:
1. Agglomeration Start Time
2. Reasonable Value of Agglomeration Start Time
3. Reasonable Injection Rate
4. Fitting Line
5. Coagulant Injection Rate
FIG. 8:
1. Jar Test
2. Water Sampling
3. Rapid Mixing
4. Slow Mixing
5. Static Keeping
6. 1-2 min.
7. 10 min.
8. 20-30 min.
9. Coagulant Injection
10. Determination of Injection Rate (after 30-40 min.) (Floc sedimentation and supernatant turbidity are estimated.)
11. Coagulation Analyzer
12. Water Sampling
13. Rapid Mixing
14. Water Removal
15. 3 min.
16. 5 min.
17. 2 min.
18. Determination of Injection Rate (10 minutes as the shortest time)
(Determination of Agglomeration Start Time)
FIG. 9:
1. Tap Water
2. Raw Water
FIG. 10:
1. Mean Particle Size
2. Floc Growth Start Time
3. Time
FIG. 11:
1. Mean Particle Number
2. Floc Number Increase Start Time
3. Time
FIG. 12:
1. Agglomeration Start Time
2. Reasonable Value of Agglomeration Start Time
3. Corrected Value of Injection Rate
4. Measured Value
5. General Formula (varying depending on water quality)
6. Injection Rate Computation Formula after constant determination
7. Reasonable Value of Coagulant Injection Rate
8. Coagulant Injection Rate

What is claimed is:

1. A method of determining an amount of coagulant to be injected to an amount of water to be treated (coagulant injection rate) in a process of water treatment, which comprises the following steps:
   (1) collecting a predetermined same amount of the water to be treated in every one of plural sample tanks, and then injecting a predetermined different amount of a coagulant to each water sample collected in those sample tanks, thereby preparing water samples each having a different coagulant injection rate;
   (2) individually mixing, after the coagulant injection thereto, every water sample to thereby disperse the coagulant therein, and individually determining the time taken before the start of agglomeration of particles in each water sample (agglomeration start time) for every water sample;
   (3) computing, based on the agglomeration start time determined for every water sample and on the coagulant injection rate for them, the correlation between the agglomeration start time and the coagulant injection rate, as a fitting line; and
   (4) computing, based on agglomeration start time data previously set for a water treatment plant and on the above fitting line, a coagulant injection rate for the water treatment plant.

2. A method of determining an amount of coagulant to be injected to an amount of water to be treated in a process of water treatment (coagulant injection rate), which comprises the following steps:
   (1) collecting a predetermined amount of water to be treated in one sample tank, then injecting a predetermined amount of a coagulant to the water sample collected in the sample tank, and after the coagulant injection, dispersing the coagulant by mixing, and determining the time taken before the start of agglomeration of the particles in the water sample;
   (2) following step (1), cleaning the sample tank, then again collecting the predetermined amount of the water to be treated in the sample tank, and injecting a different predetermined amount, which differs from that in the above step (1), of the coagulant into the water sample, and determining the agglomeration start time for the water sample;
   (3) repeating the operation of the above step (2) plural times with varying the coagulant injection amount every time, and determining the agglomeration start time for every water sample each having a different coagulant injection amount;
   (4) computing, based on the agglomeration start time determined for every water sample and on the coagulant injection rate for them, the correlation between the agglomeration start time and the coagulant injection rate, as a fitting line; and
   (5) computing, based on agglomeration start time data previously set for a water treatment plant and on the above fitting line, a coagulant injection rate for the water treatment plant.

3. The method as claimed in claim 1, further comprising counting a number of the particles in the water sample in respective particle size sections, wherein the agglomeration start time is specifically defined by at least any one time of a particle number decrease start time that is determined for the particles previously existing in the water sample before the coagulant injection thereinto and falling in predetermined small particle size sections, or a particle number increase start time that is determined owing to the start of agglomeration after the coagulant injection for the particles in the predetermined particle size sections larger than those in the above predetermined small particle size sections.

4. The method as claimed in claim 1, further comprising determining a mean particle size and a number of the particles in a water sample wherein the time at which the mean particle size begins to increase is counted as a floc growth start time, and the point at which the mean particle number to be counted as the number of flocs begins to increase is defined as a floc number increase start time, and the agglomeration start time is defined by at least any one time of the floc growth start time or the floc number increase start time.

5. The method as claimed in claim 1, wherein the agglomeration start time data is set on the basis of a residence time of the water to be treated in a mixing basin in the water treatment plant.

6. The method as claimed in claim 2, further comprising counting a number of the particles in the water sample in respective particle size sections, wherein the agglomeration start time is defined by at least any one time of a particle number decrease start time that is determined for the particles previously existing in the water sample before the coagulant injection thereinto and falling in predetermined small particle size sections, or a particle number increase start time that is determined owing to the start of agglomeration after the coagulant injection for the particles in the predetermined particle size sections larger than those in the above predetermined small particle size sections.

7. The method as claimed in claim 2, further comprising determining a mean particle size and a number of the particles in a water sample, wherein the time at which the mean particle size begins to increase is counted as a floc growth start time, and the point at which the mean particle number to be counted as the number of flocs begins to increase is defined as a floc number increase start time, and the agglomeration start time is defined by at least any one time of the floc growth start time or the floc number increase start time.

8. The method as claimed in claim 2, wherein the agglomeration start time is set on the basis of a residence time of the water to be treated in a mixing basin in the water treatment plant.

* * * * *